(12) United States Patent
De Lamberterie

(10) Patent No.: US 7,104,678 B2
(45) Date of Patent: Sep. 12, 2006

(54) LIGHT GUIDE EQUIPPED WITH REFLECTORS

(75) Inventor: Antoine De Lamberterie, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 160 days.

(21) Appl. No.: 10/766,997

(22) Filed: Jan. 28, 2004

(65) Prior Publication Data

US 2004/0184286 A1    Sep. 23, 2004

(30) Foreign Application Priority Data

Jan. 30, 2003    (FR) ................... 03 01082

(51) Int. Cl.
*F21V 7/04* (2006.01)

(52) U.S. Cl. .................. 362/560; 362/511; 362/551; 362/555; 362/558

(58) Field of Classification Search ............... 362/297, 362/346, 511, 517, 518, 538, 551, 555, 558, 362/559, 560, 800

See application file for complete search history.

(56) References Cited

U.S. PATENT DOCUMENTS 5,295,047 A    3/1994  Windross 6,123,442 A    9/2000  Freier

FOREIGN PATENT DOCUMENTS

| DE | 100 55 561 | 11/2000 |
|---|---|---|
| EP | 1036979 | 3/2000 |
| EP | 1078816 | 7/2000 |
| EP | 1243 467 | 3/2002 |

*Primary Examiner*—Stephen Husar
*Assistant Examiner*—Meghan K. Dunwiddie
(74) *Attorney, Agent, or Firm*—Morgan & Finnegan, LLP

(57) ABSTRACT

The invention concerns a lighting or signalling device for a motor vehicle, which comprises:
a linear light guide generated by the movement of a circular elementary section along a director line, the elementary section comprising a front peripheral lighting portion and a rear peripheral portion which comprises a rear light-diffusion segment;
and a light source emitting rays entering the light guide through one end;
of the type in which the rays propagate in the light guide by successive total reflections and in which the rays reaching the diffusion segment are diffused in particular towards the rear outside the length, and towards the front so as to be refracted through the front lighting portion, wherein it comprises at least one reflector which redirects forwards the rays which emerge through the rear peripheral portion.

12 Claims, 2 Drawing Sheets

LIGHT GUIDE EQUIPPED WITH REFLECTORS

FIELD OF THE INVENTION

The invention concerns a lighting or signalling device, in particular for a motor vehicle, which comprises a light guide and a light source. The invention concerns more particularly a lighting or signalling device, in particular for a motor vehicle, which comprises:

a linear light guide, at least one length of which is generated by the movement of a roughly circular vertical transverse elementary section along a director line, comprising a peripheral front lighting portion and a peripheral rear portion which comprises a rear light diffusion segment; and a light source emitting light rays which enter the light guide through at least one end face so as to be channelled by the light guide.

BACKGROUND OF THE INVENTION

It is normal to connect together in the same housing several motor vehicle lighting or signalling functions, so as to simplify the electrical wiring for these various functions.

Each function comprises a light source, a reflector and possibly a glass, these various elements being arranged so as to provide a lighting or signalling beam whose geometric and photometric characteristics must be in accordance with various regulations. Each function thus requires a minimum volume for its installation in a particular lighting or signalling device.

However, the volume available for installing lighting or signalling devices is becoming smaller and smaller, both at the front and at the rear of the motor vehicle. This is because the constraints of aerodynamics and the designs of the stylists result in shapes which are very different from those which result solely from technical considerations.

Thus, in many cases, the space available for grouping together functions in the same housing is insufficient, and it is then necessary to distribute the various functions in different housings, and hence a rise in the cost and an increase in the wiring and assembly time.

In order to resolve this problem, it is known how to use light guides. There is known for example from the document EP-A-1 243 467 a headlight comprising an elliptical module. A circular light guide surrounds the lens of the elliptical module and comprises a surface for decoupling the light cooperating with a cylindrical reflector and an annular reflector for directing the rays issuing from the light guide forwards. The purpose of such an arrangement is to increase the apparent surface of the elliptical module.

There is also known, from the document EP-A-1 036 979, a light guide provided with a line of micro-etchings on its rear face, a reflector being disposed at the rear of this light guide, the line of micro-etchings being placed substantially at the focus of the reflector. A light guide of this type is intended to be associated with other identical light guides disposed side by side in order to form a light-emitting surface.

Another light guide produced according to the prior art is depicted in FIGS. 1 to 3.

The light guide 10 comprises here two ends 12 and 14. The light guide 10 is in particular intended to channel light rays which enter through its ends 12 or 14.

The light guide 10 is obtained by the movement of a roughly circular transverse elementary section 16 along a director line 18. The director line 18 is here situated substantially at the centre of the elementary section 16 and the elementary section 16 is perpendicular to the director line 18.

The form of the director line 18 is defined freely by a person skilled in the art in particular according to aesthetic constraints. As depicted in FIG. 1, the director line 18 here is in the form of a loop.

In the description which follows, a longitudinal, vertical and transverse orientation will be adopted non-limitingly, which is indicated by the trihedron L, V, T in FIGS. 2 and 5, and which will be applied locally to all the elementary sections 16 of the light guide 10. Thus the longitudinal direction L is always perpendicular to each of the elementary sections 16, whatever the overall form of the light guide 10. Thus the vertical direction V as defined is able to vary with respect to a reference frame related for example to the motor vehicle according to the form of the director line 18.

By convention, the transverse direction T is oriented from the rear, on the right in FIGS. 2 and 5 to 9, towards the front, on the left in FIGS. 2 and 5 to 9. In the examples depicted in FIGS. 1, 3 and 4, the transverse direction T is fixed with respect to a reference frame related to the motor vehicle, and is indicated by the arrow T in FIGS. 1, 3 and 4.

As illustrated in FIG. 2, the contour 20 of the elementary section 16 comprises a front peripheral lighting portion 22 and a rear peripheral portion 24.

The rear peripheral portion 24 comprises a rear segment 26 for diffusing the light. The length of the rear segment 26 being small compared with the diameter of the elementary section 16, the rear segment 26 will be considered to be a point in the remainder of the description. A principal optical axis 28 extends transversely from the rear diffusion segment 26 as far as the front lighting portion 22.

As depicted in FIG. 3, all the rear diffusion segments 26 create a rear light diffusion line which extends parallel to the director line 18 over at least a length of the light guide 10.

The light rays enter the light guide 10 through at least one of its ends 12 or 14. The light rays are here emitted by a light source, for example a light-emitting diode 30, also referred to as an "LED", which is situated opposite the end 14.

In order to channel the light, the light guide 10 is formed from a transparent material such as glass or plastic, which has a higher refractive index than the medium in which the light guide 10 is immersed, in particular air.

As depicted in FIG. 3, the light rays Rc entering through the end 14 of the light guide 10 are channelled inside the light guide 10 by successive total reflections on the contour 20 of the elementary sections 16, which are due to the difference in refractive indices between the air and the light guide 10, in the general direction of the director line 18.

When these channelled rays Rc reach a rear diffusion segment 26, they are diffused in all directions and in particular:

towards the rear, the rays thus diffused Rd then emerge outside the light guide 10;

and towards the front inside the light guide 10.

The rays Re diffused towards the front which are included in a given solid angle around the principal optical axis 28 reach the front lighting portion 22 of the light guide 10 with an angle of incidence such that they are refracted and thus emerge outside the light guide 10.

The front lighting portion 22 thus fulfils the required lighting or signalling function for the motor vehicle.

A light guide 10 of this type makes it possible to fulfil a lighting or signalling function meeting the constraints of style and size of the vehicle.

However, a not insignificant part of the light is diffused towards the rear of the light guide 10, as indicated by the rays Rd in FIG. 3. Thus the light projected towards the front by the light guide 10 does not have optimum intensity compared with the light intensity entering through the end face 14 of the light guide 10.

SUMMARY OF THE INVENTION

In order to remedy these problems, the invention proposes a lighting or signalling device of the type described previously characterised in that it comprises at least one reflector which redirects forwards the light rays which emerge from the elementary section through its rear peripheral portion.

According to other characteristics of the invention:

the device comprises a rear reflector which is situated opposite the rear diffusion segment along the principal optical axis and which reflects towards the inside of the elementary section the rays diffused towards the rear so that they are refracted through the front peripheral portion;

in a plane perpendicular to the director line, the rear reflector has a shape such that the rays emitted by the rear segment for diffusing the light which it reflects are refracted by the elementary section so as to emerge from the front peripheral portion substantially parallel to the principal optical axis;

the rear reflector reflects the rays diffused towards the rear in a convergent fashion towards the rear diffusion segment;

the rear reflector has a vertical transverse elementary section in the form of an arc of a circle whose centre is arranged roughly on the rear diffusion segment;

the rear reflector consists of a layer of reflective material which covers the external surface of the rear diffusion segment;

the front peripheral portion forms a convergent lens whose object focus is roughly arranged on the rear diffusion segment;

the rear peripheral portion of the elementary section comprises a top lateral segment for diffusing the light which defines a secondary optical axis extending in the elementary section of the light guide from the top lateral diffusion segment downwards, and which diffuses the channelled light rays downwards inside the length and upwards outside the length; and the optical system comprises a top lateral reflector which is situated above the elementary section opposite the top lateral diffusion segment along the secondary optical axis so as to reflect the rays diffused upwards by the top lateral segment roughly forwards;

the secondary optical axis is substantially vertical and perpendicular to the principal optical axis;

the top lateral reflector has a parabolic shape whose object focus is arranged along the top lateral diffusion segment so as to reflect, forwards in a direction substantially parallel to the principal optical axis, the rays diffused upwards;

the device comprises a bottom lateral reflector which is situated below the elementary section in line with the secondary optical axis, and which reflects forwards and parallel to the principal optical axis the rays which are diffused downwards by the lateral diffusion segment and refracted by the rear peripheral portion;

the rear peripheral portion comprises a bottom part in the form of a lens whose image focus corresponds substantially to the top lateral diffusion segment so that the rays diffused downwards emerge parallel to the secondary optical axis;

the rear peripheral portion of the elementary section comprises a first top lateral diffusion segment and a second bottom lateral diffusion segment which define a secondary optical axis extending from the first top lateral diffusion segment as far as the second bottom lateral diffusion segment in a roughly vertical fashion; and the external surfaces of the first and second lateral diffusion segments are covered with a reflective material so that the rays are diffused by the lateral diffusion segments in the general direction of the secondary optical axis towards the inside of the elementary section; and the parts of the peripheral portion opposite to each of the lateral diffusion segments have the form of lenses whose object focus corresponds substantially to the lateral opposite diffusion segment so that the light rays emerge from the light guide parallel to the secondary optical axis; and the device comprises two lateral reflectors which are situated respectively above and below the elementary section opposite the lateral segments and which reflect the said light rays emerging roughly towards the front.

Other characteristics and advantages of the invention will emerge during a reading of the following detailed description, for an understanding of which reference will be made to the accompanying drawings, amongst which:

DESCRIPTION OF THE PREFERRED EMBODIMENTS

Figure 4:
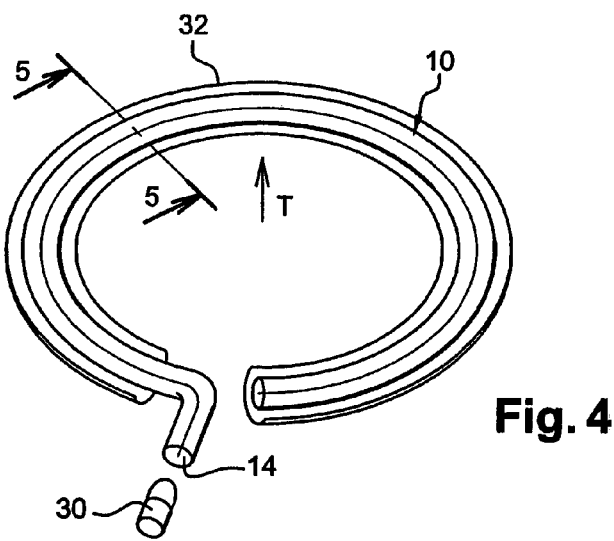
FIG. 4 is a perspective view which depicts a lighting or signalling device produced in accordance with the teachings of the invention which comprises principally the light guide of FIG. 1 and a reflector.

FIG. 4 depicts a lighting or signalling device produced according to the teachings of the invention. This device comprises the light guide 10 described in the preamble to this description, and a rear reflector 32.

The volume of the lighting or signalling device being generated by the movement of a vertical transverse elementary section of the device along the director line 18, in the remainder of the description only the vertical transverse elementary section of the lighting or signalling device will be described.

Figure 1:
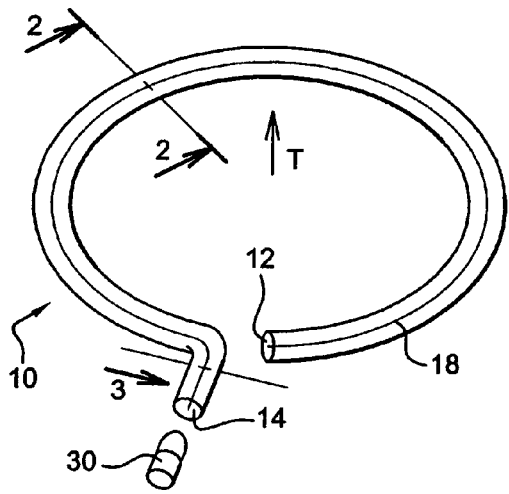
FIG. 1 is a perspective view which depicts a light guide produced according to a known design.
Figure 2:
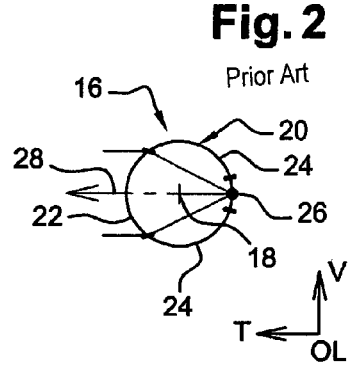
FIG. 2 is a view in section along the cutting plane 2—2 in FIG. 1 which depicts a vertical transverse elementary section of the light guide.
Figure 3:
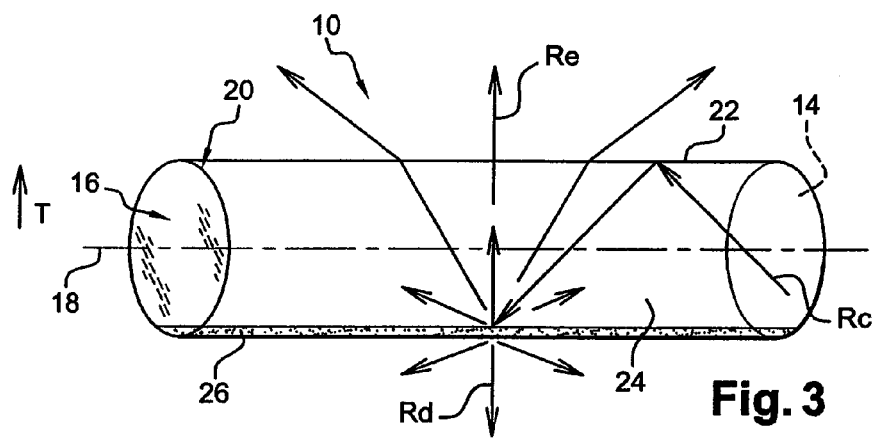
FIG. 3 is a view to a large scale which depicts part of the light guide indicated by the arrow 3 in FIG. 1.
Figure 5:
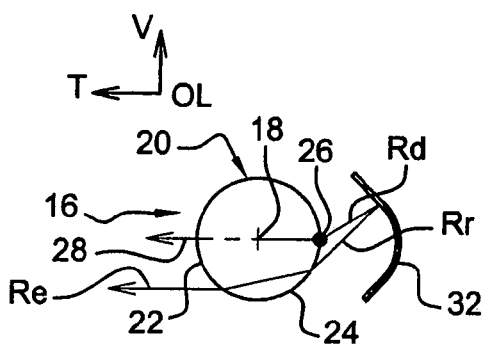
FIG. 5 is a view in section along the cutting plane 5—5 in FIG. 4 on which the path of the light rays is depicted by continuous lines.

FIG. 5 depicts the vertical transverse elementary section 16 of the light guide 10 in FIG. 1.

The contour 20 of the elementary section 16 comprises in particular the front peripheral portion 22 and the rear peripheral portion 24. The portion 22 fulfils the lighting or indicating function required for the motor vehicle.

The rear peripheral portion comprises the rear light diffusion segment 26 from which the optical axis 28 extends transversely forwards. The principal optical axis 28 cuts the elementary section 16 into two roughly symmetrical top and bottom parts.

According to the teachings of the invention, the rear reflector 32 is situated at the rear of the elementary section 16 opposite the rear diffusion segment 26 along the optical axis 28.

During the functioning of the lighting or signalling device, the light rays channelled in the light guide 10 which reach the rear diffusion segment 26 are diffused in particular towards the rear of the lighting device. The rays diffused towards the rear of the segment 26 are indicated by the reference Rd in FIG. 5.

These diffused rays Rd reach the reflective surface of the rear reflector 32 which reflects the reflected rays Rr roughly towards the front in the direction of the rear peripheral portion 24 of the light guide 10.

These reflected rays Rr are refracted a first time on entering inside the elementary section 16 through the rear peripheral portion 24, and are then refracted a second time when emerging from the elementary section 16 through the front peripheral lighting portion 22. The rays which emerge from the front peripheral lighting portion 22 are referenced Re.

Non-limitingly, the form of the rear reflector 32 is here designed by a person skilled in the art so that the emerging rays Re are substantially parallel to the principal optical axis 28. A person skilled in the art is free to adapt the form of the rear reflector 32 so that the rays Re emerge with a required distribution around the principal optical axis 28.

Figure 6:
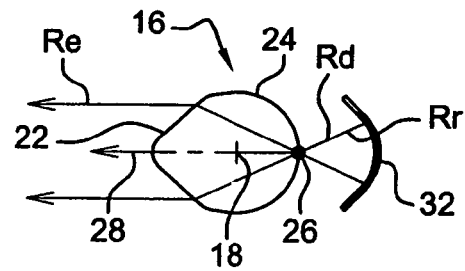
FIG. 6 is a view similar to FIG. 5 which depicts a second embodiment of the lighting or signalling device.

According to a second embodiment depicted in FIG. 6, the front peripheral lighting portion 22 of the elementary section 16 has the form of a convergent lens.

According to a known design, the focal axis of the convergent lens 22 is here merged substantially with the principal optical axis 28, and its object focus is arranged substantially at the rear diffusion segment 26. Here the rays diffused towards the front as far as the front peripheral lighting portion 22 by the rear diffusion segment 26 are refracted so as to emerge from the elementary section 16 roughly parallel to the principal optical axis 28.

According to the teachings of the invention, the rear reflector 32 has here a section roughly in the form of an arc of a circle whose optical centre is arranged substantially on the rear diffusion segment 26.

Thus the rays Rd diffused towards the rear by the rear diffusion segment 26 reach the rear reflector 32 and are then reflected towards the optical centre, that is to say the rear diffusion segment 26, so that some of the rays Rr reflected by the rear reflector 32 are rediffused forwards through the front lighting portion 22, the emergent rays Re are thus roughly parallel to the principal optical axis 28.

A person skilled in the art is free to design the form of the front peripheral lighting portion 22 so as to orient the emergent rays Re with the required angle and scattering about the principal optical axis 28.

According to a variant, not shown, the rear reflector 32 is formed by a layer of reflective material applied to the external face of the light-diffusion segment 26. Thus the lighting device functions in a similar manner to the second embodiment depicted in FIG. 6. The reflective material used is for example aluminium.

Figure 7:
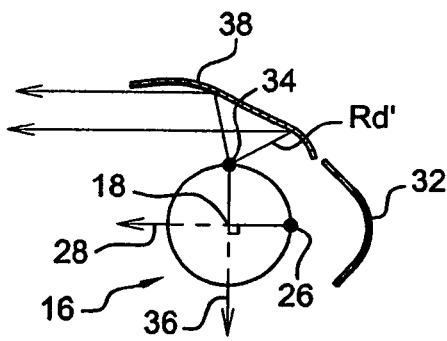
FIG. 7 is a view similar to FIG. 5 which depicts a third embodiment of the lighting or signalling device.

According to a third embodiment of the invention depicted in FIG. 7, the elementary section 16 of the light guide 10 comprises a second lateral light-diffusion segment 34.

Non-limitingly, this segment 34 is here situated on a top part of the rear peripheral portion 24 according to FIG. 7. It will therefore be referred to as the top lateral segment 34 in the remainder of the description.

This top diffusion segment 34 defines a secondary optical axis 36 which extends substantially from top to bottom through the elementary section 16 from the top diffusion segment 34. The secondary optical axis 36 here divides the elementary section 16 into two substantially symmetrical halves.

Advantageously, as depicted in FIG. 7, the secondary optical axis 36 is substantially vertical and is perpendicular to the principal optical axis 28.

The lighting device comprises a top lateral reflector 38 associated with the top lateral segment 34. The top lateral reflector 38 is situated above the elementary section 16 opposite the top segment 34 along the secondary optical axis 36.

The top light-diffusion segment 34 has, on the channelled light rays, an effect similar to that of the rear light-diffusion segment 26.

Thus, when the channelled rays reach the top lateral segment 34, they are diffused in particular upwards outside the elementary section 16 and downwards inside the elementary section 16.

The top reflector 38 has the form of an arc of a parabola whose object focus is arranged substantially on the top lateral light-diffusion segment 34. The reflector 38 is oriented so that the rays Rd' diffused upwards in the direction of the top reflector 38 are reflected in a direction substantially parallel to the principal optical axis 28 by the top reflector 38.

It is possible to combine this third embodiment with any one of the first two embodiments or variants thereof, for example with the first embodiment, as illustrated in FIG. 7.

According to a variant, not shown, of the combination depicted in FIG. 7, the rear reflector 32 and the top reflector 38 are produced in a single piece.

Figure 8:
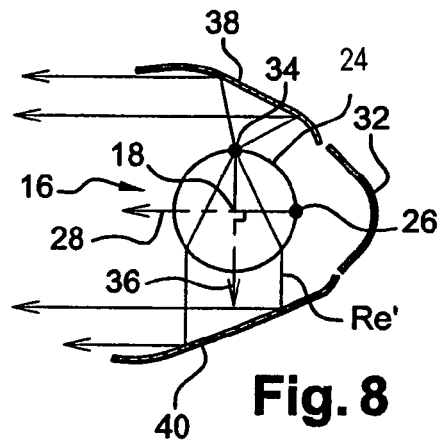
FIG. 8 is a view similar to that of FIG. 5 which depicts a fourth embodiment of the lighting or signalling device.

According to a fourth embodiment of the invention depicted in FIG. 8, the lighting device produced according to the previous embodiment comprises a bottom lateral reflector 40 which is situated under the elementary section 16 substantially opposite the secondary optical axis 36.

This bottom lateral reflector 40 is intended to reflect substantially towards the front the rays Re' which are diffused downwards by the top segment 34 and which are then refracted by passing through a bottom part of the rear peripheral portion 24 of the elementary section 16.

According to the example depicted in FIG. 8, the part of the rear peripheral portion 24 through which the rays diffused downwards are refracted is in the form of a convergent lens whose object focus is arranged substantially at the top diffusion segment 34.

Thus the light rays Re' diffused downwards by the top segment 34 are refracted through the rear peripheral portion so as to emerge substantially parallel to the secondary optical axis 36.

The bottom lateral reflector 40 here has a parabolic shape overall whose focus is merged with the image of the top segment 34 in the lens formed by the bottom part of the rear peripheral portion 24 and is oriented so that the rays refracted downwards are reflected forwards substantially parallel to the principal optical axis 28.

According to a variant of the invention which is not shown, the top reflector 38, the bottom reflector 40 and the rear reflector 32 are produced in a single piece.

According to a variant, not shown, of the third and fourth embodiments, the lateral diffusion segment 34 is situated on a bottom part of the rear peripheral portion 24. This reversal of the position of the lateral diffusion segment 34 does not modify the overall functioning of the lighting or signalling device. What was described previously is therefore applicable to this variant except for symmetry with respect to the principal optical axis.

Figure 9:
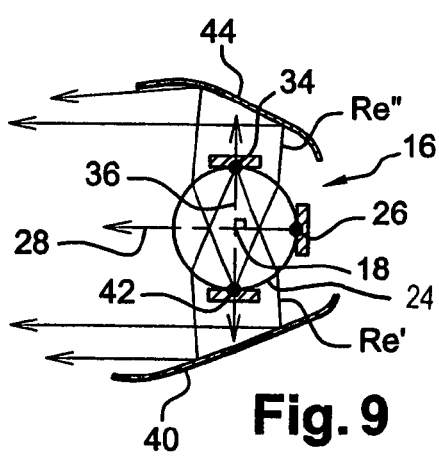
FIG. 9 is a view similar to that of FIG. 5 which depicts a fifth embodiment of the lighting or signalling device.

According to a fifth embodiment which is depicted in FIG. 9 and which can be combined with the first two embodiments and their variants, the elementary section 16 comprises a top diffusion segment 34 and a bottom diffusion segment 42.

The bottom light-diffusion segment 42 is situated on the external face of the rear peripheral portion 24 at the intersection with the secondary optical axis 36 as defined previously, that is to say vertical and diametral with respect to the elementary section 16. Thus the top segment 34 and the bottom segment 42 are facing each other.

Each of these lateral segments 34 and 42 is covered with a reflective material, for example aluminium. The light is thus diffused exclusively towards the inside of the elementary section 16, that is to say downwards by the top segment 34 and upward by the bottom segment 42.

The lighting device also comprises two bottom 40 and top 44 lateral reflectors. They are intended to reflect forwards the light rays Re' and Re" respectively diffused towards the inside of the elementary section 16 by the two lateral segments 34 and 42 and then refracted by the rear peripheral portion of the elementary section 16.

In the example illustrated in FIG. 9, the rear diffusion segment 26 is here covered with a reflective material such as for example aluminium.

The top and bottom parts of the rear peripheral portion 24 have here the form of convergent lenses so as to refract the light diffused by the segments 34 and 42 substantially parallel to the secondary optical axis 36.

Lateral reflectors 40 and 44 have roughly a parabolic shape whose focus is respectively merged with the image of the top 34 and bottom 42 segments in the lens consisting respectively of the bottom and top parts of the rear peripheral portion 24, and are oriented so as to reflect forwards and parallel to the principal optical axis 28 the rays refracted by the rear peripheral portion 24.

According to another embodiment of the invention, not shown, the reflection of the rays diffused towards the rear by the rear segment 26 is effected according to one of the first two embodiments. The top 44, bottom 40 and rear 32 reflectors are then produced in a single piece.

According to a variant, not shown, of the fifth embodiment, the light guide 10 comprises only one lateral diffusion segment 34 or 42 and a single associated reflector respectively 40 or 44.

The present invention therefore increases the intensity of the light emitted by the lighting device towards the front by increasing firstly the brightness of the light source represented by the rear diffusion segment 26 or by increasing the apparent surface by virtue of the segments 42 and 34.

According to a variant, not shown, of each of the embodiments, the diffusion segments 26, 34 and 42 and the reflectors which are associated with them can be produced on only one or several light guide portions 10.

What is claimed is:

1. A lighting or signaling device, in particular for a motor vehicle, which comprises:
    (a) a light guide comprising an elongated body and a pair of opposite end faces, at least one portion of light guide having a roughly circular vertical transverse elementary section along a director line, the contour of the elementary section comprising a front peripheral lighting portion and a rear peripheral portion which comprises a rear light-diffusion segment, the elementary section comprising a principal optical axis with a transverse direction which extends from rear to front from the rear light-diffusion segment as far as the front peripheral lighting portion;
    (b) a light source emitting light rays which enter the light guide through at least one end face so as to be channeled by the light guide whereby the channeled light rays propagate in the light guide by successive total reflections in the general direction of the director line, and in which the channeled light rays reaching the rear light-diffusion segment are diffused, the rays diffused towards the rear emerging outside the length, and the rays diffused towards the inside of the guide included in a given solid angle around the principal optical axis being refracted through the front peripheral lighting portion of the length; and
    (c) a rear reflector situated opposite the rear light-diffusion segment along the principal optical axis which reflects towards the inside of the elementary section the rays diffused towards the rear so that they are refracted through the front peripheral lighting portion.

2. The device according to claim 1, wherein, in a plane perpendicular to the director line, the rear reflector has a shape such that the rays emitted by the rear light-diffusing segment which it reflects are refracted by the elementary section so as to emerge from the front peripheral lighting portion substantially parallel to the principal optical axis.

3. The device according to claim 1, wherein the rear reflector reflects the rays diffused towards the rear in a convergent fashion towards the rear light-diffusion segment.

4. The device according to claim 3, wherein the rear reflector has a vertical transverse elementary section in the form of an arc of a circle whose centre is arranged globally on the rear light-diffusion segment.

5. The device according to claim 3, wherein the rear reflector consists of a layer of reflective material which covers the external surface of the rear light-diffusion segment.

6. The device according to claim 2, wherein the rear reflector reflects the rays diffused towards the rear in a convergent fashion towards the rear light-diffusion segment, and wherein the front peripheral lighting portion forms a convergent lens whose object focus is approximately arranged on the rear light-diffusion segment.

7. The device according to claim 1, wherein:
    (a) the rear peripheral portion of the elementary section comprises a top lateral light-diffusion segment which defines a secondary optical axis extending in the elementary section of the light guide from the top lateral light-diffusion segment downwards, and which diffuses the channeled light rays downwards inside the length and upwards outside the length; and
    (b) the device comprises a top lateral reflector situated above the elementary section opposite the top lateral light-diffusion segment along the secondary optical axis so as to reflect the rays diffused upwards by the top lateral segment roughly forwards.

8. The device according to claim 7, wherein the secondary optical axis is substantially vertical and perpendicular to the principal optical axis.

9. The device according to claim 7, wherein the top lateral reflector has a parabolic shape whose object focus is arranged on the top lateral light-diffusion segment so as to reflect forwards, in a direction substantially parallel to the principal optical axis, the rays diffused upwards.

10. The device according to claim 7, which comprises a bottom lateral reflector situated under the elementary section in line with the secondary optical axis and which reflects, forwards and parallel to the principal optical axis, the rays which are diffused downwards by the top lateral light-diffusion segment and refracted by the rear peripheral portion.

11. The device according to claim 10, wherein the rear peripheral portion comprises a bottom part in the form of a lens whose image focus corresponds substantially to the top lateral light-diffusion segment so that the rays diffused downwards emerge parallel to the secondary optical axis.

12. The device according to claim 1, wherein:

(a) the rear peripheral portion of the elementary section comprises a first top lateral light-diffusion segment and a second bottom lateral light-diffusion segment which define a secondary optical axis extending from the first top lateral light-diffusion segment as far as the second bottom lateral light-diffusion segment in a roughly vertical fashion;

(b) the external surfaces of the first and second lateral light-diffusion segments are covered with a reflective material so that the rays are diffused by the lateral light-diffusion segments in the general direction of the secondary optical axis towards the inside of the elementary section;

(c) the parts of the peripheral portion opposite to each of the lateral light-diffusion segments are in the form of lenses whose object focus corresponds substantially to the opposite lateral light-diffusion segment so that the light rays emerge from the light guide parallel to the secondary optical axis; and (d) the device comprises two lateral reflectors which are situated respectively below and above the elementary section opposite the lateral segments and which reflect the emerging light rays roughly towards the front.

* * * * *